Patented Oct. 10, 1939

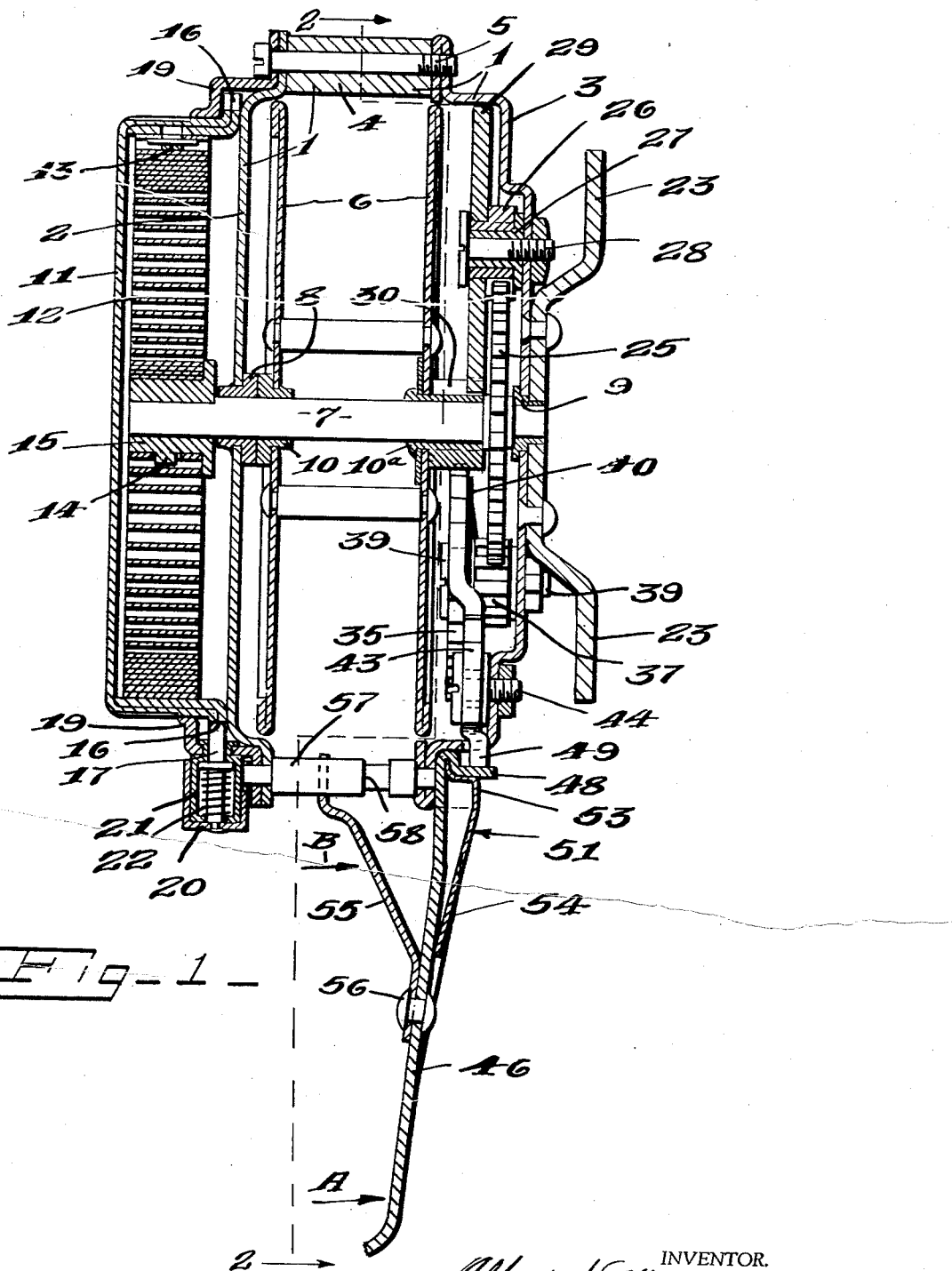

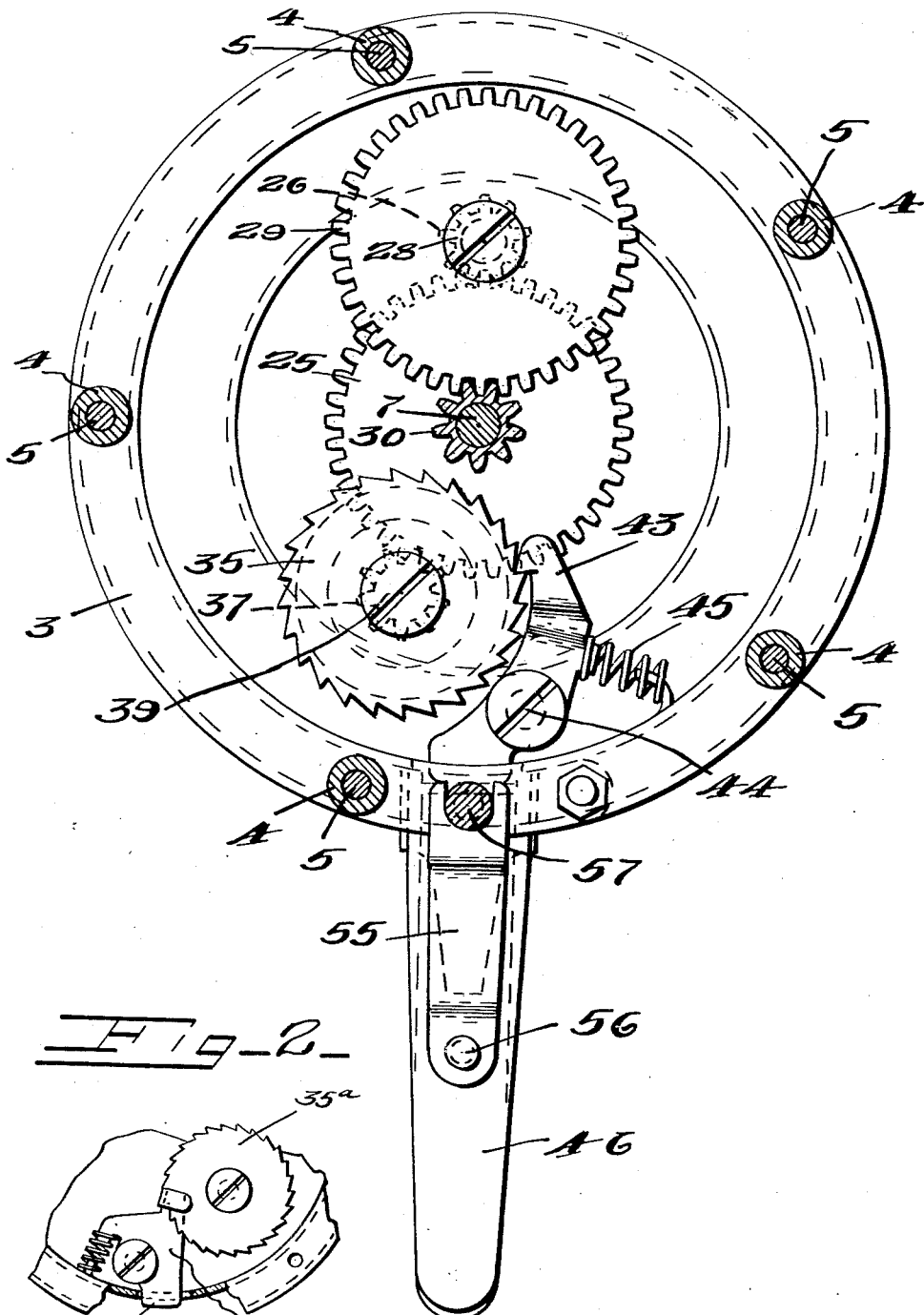
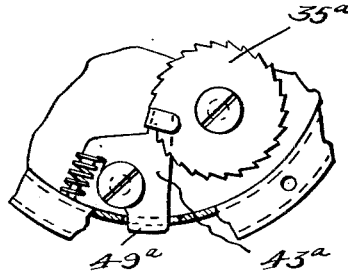

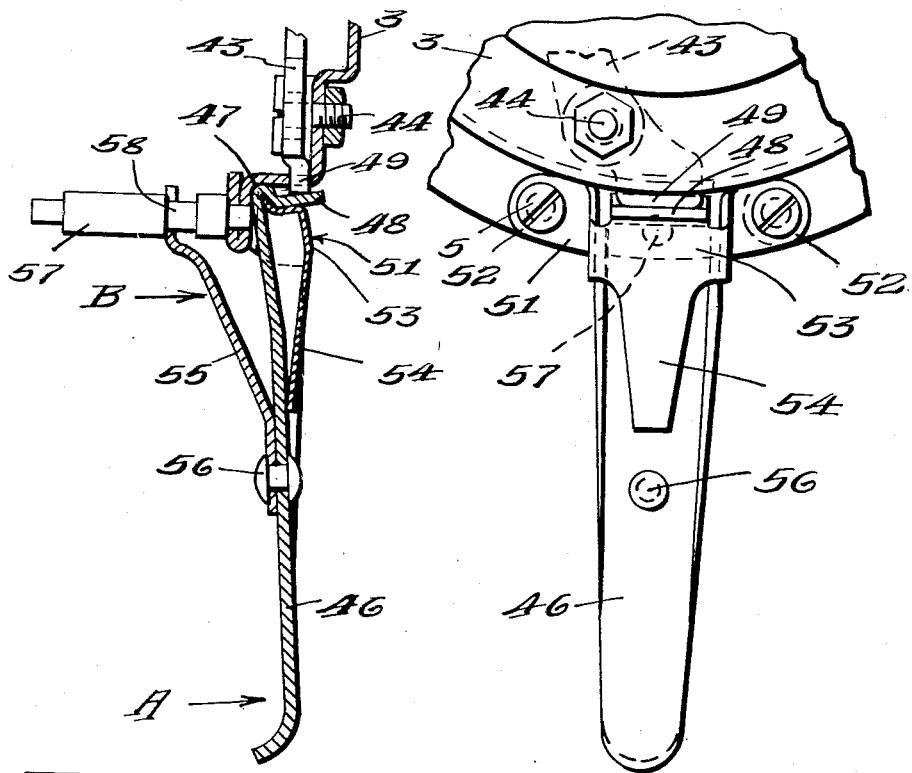
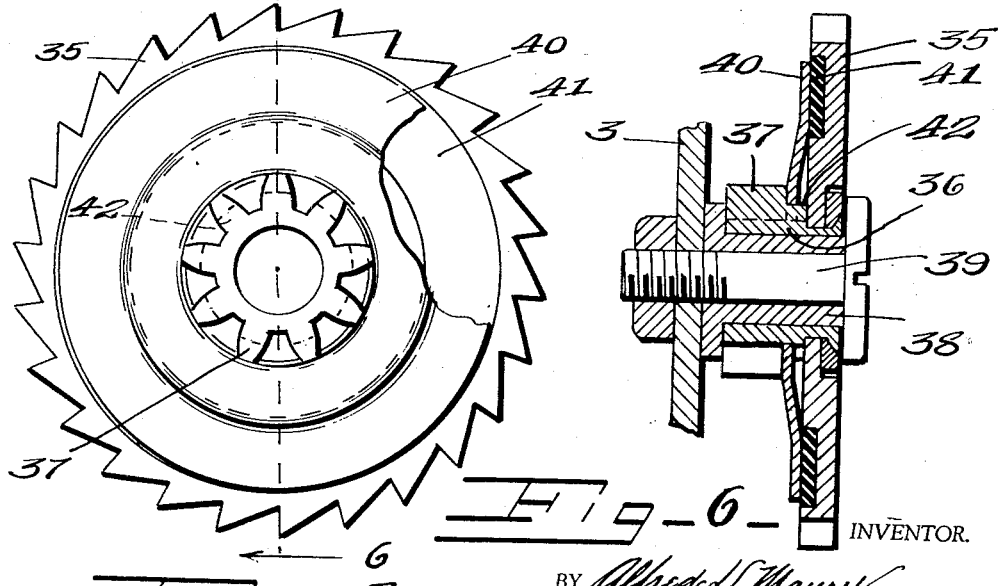

2,175,756

UNITED STATES PATENT OFFICE 2,175,756

AUTOMATIC FISHING REEL

Alfred D. Maury, Ilion, N. Y.

Application September 2, 1937, Serial No. 162,170

7 Claims. (Cl. 242—84.3)

This invention relates to automatic fishing reels, and has for its object a fishing reel in which a brake, not subject to wear, includes a mechanism to provide a click such as occurs in the conventional type of crank reels to indicate to the fisherman when a fish has been caught and is running out the line.

It also has for its object a brake which coacts with some part, other than the reel itself.

It also has for its object a brake mechanism including a friction clutch device to relieve the reel or spool and parts from undue strains, when under momentum and the brake is applied.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a sectional view on an enlarged scale, taken diametrically of the fishing reel, the brake operating lever being shown as in its normal position.

Figure 2 is a sectional view taken on line 2—2, Figure 1.

Figure 3 is a detail view, partly in section, of the brake lever or operating member of the brake lever in its assumed position, when the brake is locked or held out in its released position.

Figure 4 is a fragmentary elevation, looking to the left in Figure 3.

Figure 5 is a detail view of the brake mechanism.

Figure 6 is a sectional view on line 6—6, Figure 5.

Figure 7 is a fragmentary elevation of the ratchet wheel and contiguous parts, showing a different pawl arrangement from that seen in Figure 2.

The automatic fishing reel includes a suitable housing or casing for attachment to the handle of a fish pole, a reel or spool on which the line is wound rotatably mounted in the housing, winding spring mechanism, and motion transmitting means including gearing between the same and the reel, and a manually operable brake mechanism including elements coacting with a part, other than the reel on which the line is wound, said elements being actuated by the gearing.

The brake mechanism also includes a ratchet or clicking device and a shock absorbing device or friction clutch.

1 designates the housing which is cylindrical in general form and which includes opposing side plates 2, 3 and spacers 4 between them with fastening means, as screws 5, extending through the margins of the side plates 2, 3 and the spacers 4.

6 designates the spool or reel rotatably mounted on a spindle 7, which is mounted in the bearings 8, 9 in the side plates 2, 3. The reel or spool has hubs 10, 10ª rotatably mounted on the spindle 7.

The spring mechanism includes a spring barrel 11 rotatably mounted in any suitable manner on the housing or the side plate 2 thereof, and a coil spring 12 within the barrel and anchored at one end at 13 thereto and at its other end at 14 to a hub 15 on the end of the spindle 7 projecting beyond the side plate 2, the hub being suitably secured to the spindle 7 to rotate as a unit therewith. The spring barrel is provided with suitable peripheral ratchet teeth 16 with which coacts a spring-pressed poppet or pawl 17 suitably carried by the housing, it being here shown as mounted in a ring 19 secured to the housing or the side plate 2 thereof by the screws 5 and housing that portion of the spring barrel provided with the ratchet teeth 16. The spring-pressed pawl or poppet 17 is for holding the spring under tension, and it is operable to release the spring barrel to permit the spring to be untensioned, as for instance, when the reel is to be laid away or not used.

As here shown, the spring-pressed poppet is secured to the head of a cap 20 which telescopes over a tubular post 21 extending radially from the ring 19, the poppet having a shoulder within the post. A returning spring 22 is interposed between the shoulder and the outer end of the tubular post. Obviously, by pulling out on the cap, the poppet or pawl will release the spring barrel and permit the spring to unwind or untension.

The housing or the side plate 3 is provided with suitable prongs or lugs 23 for attachment to the handle or butt of the fish pole by the usual rings.

The motion transmitting means between the spring 12 and the reel or spool 6 includes, in addition to the spindle 7, a gear 25 mounted on the end of the spindle 7, remote from the spring 12, to rotate with the spindle, a pinion 26 meshing with the gear 25 and mounted on a bushing or bearing 27, which in turn is mounted on a stud 28 carried by the side plate 3, a gear 29 rotatable with the pinion 27 and here shown as mounted on the hub thereof, and meshing with the pinion 30 on the hub or bearing 10ª of the reel 6 in which one end of the spindle 7 is journalled, all so that upon rotation of the spindle 7 by the spring 12, the motion is transferred to the reel or spool 6 through the gear 25, pinion 26, gear 29 and pinion 30, and upon rotation of the reel by the pull of the line wound on the reel, the spindle 7 is rotated and the spring rewound through the pinion 30, gear 29, pinion 26, gear 25.

The brake mechanism includes a wheel rotatable by the motion transmitting means or one of the elements thereof, a manually controlled member coacting with the wheel and a friction clutch acting on the wheel to permit slipping under certain conditions and hence prevent straining of the parts. The wheel is here shown as a ratchet wheel and the member coacting therewith a spring-pressed pawl capable of normally ratcheting under the pull of the line by a fish and exerting a braking effect, and operable manually out of engagement with the ratchet wheel to permit the spring of the winding mechanism to react and wind up the line. Means is also provided for temporarily locking the ratchet entirely out of engaged position to permit the spring to react automatically and take up slack in the line when playing the fish. The ratchet wheel and pawl are of metal, preferably steel hardened against wear.

35 designates the ratchet or brake wheel mounted upon the hub 36 of a pinion 37 which in turn is mounted upon a bushing 38 on a stud 39 mounted in the side plate 3 of the housing, the ratchet wheel 35 being capable of rotating about or relatively to the pinion 37. The pinion 37 meshes with the gear 25 mounted on the spindle 7.

40 is a friction disk or plate keyed to the pinion 37 to rotate therewith and coacting with a friction face 41 on the side of the gear 35, the friction face being an insert in a groove or channel formed in the side face of the gear 35. The disk or plate 40 is dished or under tension to press its margin against the friction face 41. The friction plate 40 is secured to the pinion 37 to rotate therewith by forming it with internal gear teeth interfitting with the reduced ends 42 of the teeth of the pinion 37 and shouldering against the ends of the unreduced portions of the teeth of the pinion 37.

43 designates the pawl coacting with the ratchet wheel 35, this being pivotally mounted at 44 on the side plate 3 of the housing and being spring-pressed against the ratchet wheel by a suitable spring 45. The pawl 43ª shown in Figure 7 is a trailing pawl and that end or tooth shaped to embrace or straddle the margin of the ratchet wheel 35ª.

46 designates a finger or operating lever for operating the pawl 43 to release it, this including a handle portion which extends radially outward relative to the cylindrical casing along the handle of the fish pole, it being pivotally connected at 47 to the housing and having an angular portion 48 at its pivoted end for coacting with a heel 49 of the pawl 43. It is here shown as pivoted to the plate 3 by being seated at its angle in a seat at the margin of the plate 3 and as held in its seat by a clip 51 secured at its ends at 52 to the plate and having its intermediate portion 53 bridging the lever 46, this clip having an outwardly extending spring arm 54 pressing against the handle portion of the lever 46 and normally pressing the lever into its position assumed when the pawl is engaged with the ratchet wheel 35, to permit pulling out of the line but preventing winding up of the line by the spring.

Pressure applied to the handle portion of the lever 46 in the direction of the arrow "A" (Figures 1 and 3) obviously causes the lever to act on the heel 49 of the pawl 43 or 49ª of the pawl 43ª (Figure 7) to withdraw the pawl out of engagement with the ratchet wheel 35 or 35ª, and thus permit the spring 12 to act automatically to take up the slack in the line and permit the feeding out of the line under the pull of the fish, without a clicking or braking action.

In order that while playing a fish, the fisherman need not hold the lever 46 operated, means is provided for locking the lever 46 in its "out" position. As here shown, this means consists of a lock-out device 55, as a brace or strip secured at 56 to the handle end of the lever 46 and coacting with a keeper or catch device on the casing. As here shown, this keeper or catch device consists of a post 57 extending between the margins of the side plates 2, 3 between two of the spacers 4, the post being provided with a notch or annular groove 58. The inner end of the lock-out device or strip 55 is bifurcated and arranged astride the post normally on the full portion of the post.

When pressure is applied to the lock-out device 55, in the direction of the arrow "B" (Figures 1 and 3), the bifurcated end moves along the full portion of the post and snaps into the notch or groove 58 and during this movement, the handle end of the lever 46 is pressed to the right, against the action of the spring 54 and its angle at 47 acts on the tail of the pawl 43 to hold the pawl out of engagement with the ratchet wheel. Assuming the spring has been properly tensioned by winding the spring barrel and the desired amount of line fed out, the parts of the brake and pawl mechanism are in the position shown in Figure 2. When a bite is obtained, the fish usually runs out the line and in so doing, the brake wheel 35 will be turned in one direction and the pawl 43 will ratchet and click, notifying the fisherman. He may then release the pawl by pressing on the handle end of the lever 46 to permit the spring of the winding mechanism to react or lock the lever 46 or the pawl in its "out" position and let the reel work automatically without any attention on his part as to operating the brake lever 46.

If the brake 46 is released when the spring 12 is fully wound and the pawl 43 is engaged with the ratchet wheel 35 while the ratchet wheel is revolving rapidly, the clutch plate 40 will slip relatively to the ratchet wheel 35, and thus prevent damage to the reel, or the pressure plate 40 slips relatively to the ratchet 35 when the ratchet 35 is held stationary and enough turning pressure applied to the gear 25. When the pawl 43 is permitted to engage the ratchet wheel 35, and the reel is unwinding rapidly, under the pull of the fish, and the fish reverses its movement suddenly, letting the line become suddenly slack, the pawl 43 immediately re-engages the ratchet wheel 35 and acts as a brake to prevent further unwinding of the reel and feeding in of the line under the momentum previously given by the reel. Under these conditions, in order to wind up the slack, the fisherman will have to operate the lever 46 to release the ratchet wheel 35 and the pawl 43 to permit the spring of the winding mechanism to react, or operate the lock-out mechanism to lock the pawl 43 "out".

What I claim is:

1. In an automatic fishing reel including a suitable housing for attachment to the handle of a fish pole, and a reel, winding spring mechanism, and motion transmitting means between the same and the reel, all carried by the housing, the motion transmitting means including a train of gears, the combination of a brake wheel, a pinion meshing with one of the gears of the train, a friction clutch between the pinion and the brake wheel, and manually operated means for controlling the movement of the brake wheel, the brake wheel being a ratchet wheel and the manually operable means including a spring-pressed pawl coacting with the ratchet wheel, and an operating lever operable to release the pawl out of engaged position.

2. In an automatic fishing reel including a suitable housing for attachment to the handle of a fish pole, and a reel, winding spring mechanism, and motion transmitting means between the same and the reel, all carried by the housing, the motion transmitting means including a train of gears, the combination of a brake wheel, a pinion meshing with one of the gears of the train, a friction clutch between the pinion and the brake wheel, manually operated means for controlling the movement of the brake wheel, the brake wheel being a ratchet wheel and the manually operable means including a spring-pressed pawl coacting with the ratchet wheel, an operating lever operable to release the pawl out of engaged position, and means for locking the pawl in "out" position.

3. In an automatic fishing reel including a suitable housing for attachment to the handle of a fish pole, and a reel, winding spring mechanism, and motion transmitting means between the same and the reel, all carried by the housing, the motion transmitting means including a train of gears, the combination of a brake wheel, a pinion meshing with one of the gears of the train, a friction clutch between the pinion and the brake wheel, and manually operated means for controlling the movement of the brake wheel, the brake wheel being a ratchet wheel and the manually operable means including a spring-pressed pawl coacting with the ratchet wheel, an operating lever operable to release the pawl out of engaged position, and manually operable means acting on the operating lever to hold it in its position assumed when the pawl is in its "out" position.

4. In an automatic fishing reel including a suitable housing for attachment to the handle of a fish pole, and a reel, winding spring mechanism, and motion transmitting means between the same and the reel, all carried by the housing, the motion transmitting means including a train of gears, the combination of a brake wheel, a pinion meshing with one of the gears of the train, a friction clutch between the pinion and the brake wheel, and manually operated means for controlling the movement of the brake wheel, the brake wheel being a ratchet wheel and the manually operable means including a spring-pressed pawl coacting with the ratchet wheel, and an operating lever pivotally mounted on the housing and having a handle portion extending radially relatively to the housing and an angular portion coacting with the pawl and operating to release the pawl out of engaged position.

5. In an automatic fishing reel including a suitable housing for attachment to the handle of a fish pole, and a reel, winding spring mechanism, and motion transmitting means between the same and the reel, all carried by the housing, the motion transmitting means including a train of gears, the combination of a brake wheel, a pinion meshing with one of the gears of the train, a friction clutch between the pinion and the brake wheel, and manually operated means for controlling the movement of the brake wheel, the brake wheel being a ratchet wheel and the manually operable means including a spring-pressed pawl coacting with the ratchet wheel, and an operating lever pivotally mounted on the housing and having a handle portion extending radially relatively to the housing and an angular portion coacting with the pawl and operating to release the pawl out of engaged position, and an independently manually operable device for holding the lever in its operated position.

6. In an automatic fishing reel including a suitable housing for attachment to the handle of a fish pole, and a reel, winding spring mechanism, and motion transmitting means between the same and the reel, all carried by the housing, the motion transmitting means including a train of gears, the combination of a brake wheel, a pinion meshing with one of the gears of the train, a friction clutch between the pinion and the brake wheel, and manually operated means for controlling the movement of the brake wheel, the brake wheel being a ratchet wheel and the manually operable means including a spring-pressed pawl coacting with the ratchet wheel, and an operating lever pivotally mounted on the housing and having a handle portion extending radially relatively to the housing and an angular portion coacting with the pawl and operating to release the pawl out of engaged position, and an independently manually operable device for holding the lever in its operated position, said device including a part carried by and movable with the lever and operable independently of the lever.

7. In an automatic fishing reel, the combination of a housing, a line spool rotatably mounted in the housing, a ratchet wheel mounted in the housing, a spring-pressed pawl coacting with the ratchet wheel, manually operable means for releasing the pawl from the ratchet wheel, a motor spring, motion transmitting means between the spring and the spool and the ratchet wheel including a friction clutch, said clutch coacting with the ratchet wheel.

ALFRED D. MAURY.